US008631648B2

(12) United States Patent
Lambert et al.

(10) Patent No.: US 8,631,648 B2
(45) Date of Patent: *Jan. 21, 2014

(54) DIESEL TURBINE SCR CATALYST

(75) Inventors: Christine Kay Lambert, Dearborn, MI (US); Yinyan Huang, Northville, MI (US); Harold Huimin Sun, West Bloomfield, MI (US); Christopher Oberski, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 173 days.

This patent is subject to a terminal disclaimer.

(21) Appl. No.: 13/168,346

(22) Filed: Jun. 24, 2011

(65) Prior Publication Data

US 2011/0247327 A1 Oct. 13, 2011

Related U.S. Application Data

(63) Continuation of application No. 12/098,280, filed on Apr. 4, 2008, now Pat. No. 7,971,430.

(51) Int. Cl.
*F01N 3/10* (2006.01)
*F01N 3/00* (2006.01)

(52) U.S. Cl.
USPC .................. 60/301; 60/274; 60/286; 60/287; 60/288; 60/299; 60/303

(58) Field of Classification Search
USPC .......... 60/274, 280, 282, 286–289, 299, 301, 60/303, 614
See application file for complete search history.

(56) References Cited

U.S. PATENT DOCUMENTS

| 5,987,882 | A | 11/1999 | Voss et al. |
| 6,063,350 | A | 5/2000 | Tarabulski et al. |
| 6,470,682 | B2 | 10/2002 | Gray, Jr. |
| 6,763,799 | B2 | 7/2004 | Ito et al. |
| 6,823,660 | B2 | 11/2004 | Minami |

(Continued)

FOREIGN PATENT DOCUMENTS

| GB | 2357120 A | 6/2001 |
| JP | 2004239109 A | 8/2004 |
| WO | 2005064131 A1 | 7/2005 |

OTHER PUBLICATIONS

Partial Translation of Office Action of Chinese Application No. 200910004487.X, Issued Jul. 4, 2012, State Intellectual Property Office of PRC, 9 Pages.

*Primary Examiner* — Kenneth Bomberg
*Assistant Examiner* — Jason Sheppard
(74) *Attorney, Agent, or Firm* — Julia Voutyras; Alleman Hall McCoy Russell & Tuttle LLP

(57) ABSTRACT

A system for treating exhaust gases from an engine is described. The system includes, the exhaust gases routed from the engine to atmosphere through an exhaust passage, the system comprising: an injector directing a spray of reductant into the exhaust gases routed from the engine to atmosphere; an exhaust separation passage that separates an exhaust gas flow received from the engine into a plurality of separate exhaust gas flows; a plurality of oxidation catalysts, each of which receives one of the plurality of separate exhaust gas flows; a flow combining passage that receives the plurality of separate exhaust gas flows and combines them into a re-combined exhaust gas flow; a turbocharger that receives the re-combined exhaust gas flow from the flow combining passage; and a selective catalytic reduction catalyst positioned downstream of the turbocharger.

20 Claims, 3 Drawing Sheets

(56) References Cited

U.S. PATENT DOCUMENTS

| | | |
|---|---|---|
| 6,834,496 B2 | 12/2004 | Nakatani et al. |
| 6,925,802 B2 * | 8/2005 | Arnold .......................... 60/602 |
| 7,007,463 B2 | 3/2006 | Shirakawa |
| 7,263,824 B2 | 9/2007 | Bellinger et al. |
| 7,765,800 B2 | 8/2010 | Tsumagari et al. |
| 2003/0192306 A1 | 10/2003 | Nakatani et al. |
| 2004/0074231 A1 | 4/2004 | Bruck |
| 2006/0080953 A1 | 4/2006 | Maus et al. |

* cited by examiner

DIESEL TURBINE SCR CATALYST

CROSS REFERENCE TO RELATED APPLICATIONS

The present application is a continuation of U.S. patent application Ser. No. 12/098,280, filed Apr. 4, 2008, the entire contents of which are incorporated herein by reference.

BACKGROUND AND SUMMARY

An engine exhaust system may include various components to enhance engine operation and reduce emissions. These may include selective catalytic reduction (SCR) catalysts, oxidation catalysts, NOx traps, turbochargers, exhaust gas recirculation, etc.

One example of such an engine exhaust system is described in U.S. 2006/0080953. In the exhaust system described in U.S. 2006/0080953, a reducing agent is supplied to an exhaust gas stream upstream of a turbocharger that aids in the breakdown and distribution of the reducing agent (suspended within the exhaust gas stream) prior to the exhaust gas stream reaching a downstream oxidation and SCR catalyst. Furthermore, in this example, multiple separate exhaust gas flows from multiple cylinders are funneled through individual oxidation catalysts, each of the individual oxidation catalysts arranged in an individual tube of an exhaust manifold. Thus, as described in U.S. 2006/0080953, separate exhaust flows are ejected by an engine and immediately passed through separate oxidation catalysts. The separate exhaust flows are then combined into a single exhaust gas flow and injected with a liquid reductant prior to reaching a downstream mixer.

The inventors herein have recognized numerous issues with the above approach. In particular, because the exhaust gases are delivered separately from the cylinders to the upstream catalyst 5, the packaging of multiple oxidation catalysts within individual exhaust manifold tubes may increase packaging constraints on other vital engine components. Correspondingly, the ease of manufacture of such an exhaust system may be reduced and the related manufacturing costs may be increased.

In one approach, a system for treating exhaust gases from an engine, the exhaust gases routed from the engine to atmosphere through an exhaust passage, is provided. The system comprises an injector directing a spray of reductant into the exhaust gases; a first flow combining passage that combines exhaust gas from a plurality of cylinders; an exhaust separation passage, downstream of the first combining passage, that separates an exhaust gas flow into a plurality of separate exhaust gas flows; a plurality of oxidation catalysts, each of which receives one of the plurality of separate exhaust gas flows; a second downstream flow combining passage that receives the plurality of separate exhaust gas flows and combines them into a re-combined exhaust gas flow; a turbocharger that receives the re-combined exhaust gas flow; and a selective catalytic reduction catalyst positioned downstream of the turbocharger.

In this way, by first combining and then separating the exhaust gases ejected by the engine prior to injecting a liquid reductant and passing the re-combined exhaust gas flow through the turbocharger, the exhaust treatment system may be more compactly and flexibly packaged and may thus allow for more flexibility in the arrangement and packaging of other vital vehicle components. Correspondingly, the ease and cost of manufacturing such an exhaust treatment system may be reduced. Furthermore, by first combining the exhaust gases ejected by individual cylinders, separating the resulting single exhaust gas flow and then re-combining the exhaust gas flow into a re-combined exhaust gas flow, the geometrical relationship between the plurality of separated exhaust gas flows upon being re-combined by the second downstream flow combining passage may be configured such that a more turbulent re-combined flow may be realized. This increased turbulence within the re-combined flow may increase the breakdown (into ammonia) and distribution of a liquid reductant (within the re-combined exhaust gas flow) injected therein.

By arranging oxidation catalysts upstream of a turbocharger, the oxidation catalysts and SCR catalyst can be located in warmer locations (i.e., closer to the engine) and may thus allow for both the oxidation catalysts and the SCR catalyst to reach light-off temperature more quickly. As such, fewer emissions may be released to atmosphere during the initial "warm-up" phase of the engine. Additionally, this increased thermal efficiency may reduce the need for parasitic rapid warming conventions (that reduce overall fuel economy) that may use fuel for heating purposes.

Another potential advantage of the present disclosure is that, in some embodiments, the impingement of the exhaust gases upon the rotating blades integral and internal to the turbocharger may aid in the breakdown of the injected urea (suspended within the exhaust gases) into ammonia and in the uniformity of distribution of the ammonia droplets suspended within the exhaust gases. Likewise, the SCR washcoat coating the blades of the turbocharger may further enhance the breakdown of urea into ammonia. Thus, the overall efficiency of NOx removal by the SCR catalyst arranged downstream of the turbocharger may be improved.

DETAILED DESCRIPTION

Figure 1:
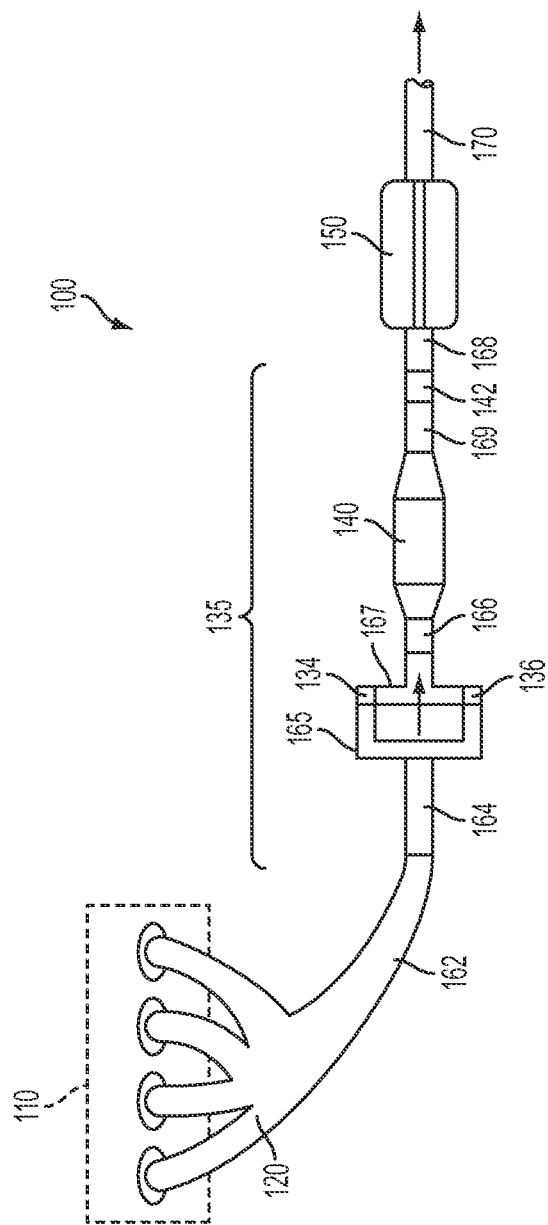
FIG. 1 illustrates an exhaust system for transporting and treating exhaust gases produced by an internal combustion engine according to an embodiment of the present disclosure.

FIG. 1 illustrates an exhaust system 100 for transporting and treating exhaust gases produced by internal combustion engine 110. As one non-limiting example, engine 110 includes a diesel engine that produces a mechanical output by combusting a mixture of air and diesel fuel. Alternatively, engine 110 may include other types of engines such as gasoline burning engines, among others. Further, engine 110 may be configured in a propulsion system for a vehicle. Alternatively, engine 110 may be operated in a stationary application, for example, as an electric generator. While exhaust system 100 may be applicable to stationary applications, it should be appreciated that exhaust system 100 as described herein, is particularly adapted for vehicle applications.

Exhaust system 100 may include one or more of the following: an exhaust manifold 120 for receiving exhaust gases produced by one or more cylinders of engine 110, oxidation catalysts 134 and 136 arranged downstream of exhaust manifold 120 for reducing unburned hydrocarbons and carbon monoxide in the exhaust gas flow stream, a turbocharger 166 that may receive exhaust gas flow streams from oxidation catalysts 134 and 136, an injector 132 that may inject a liquid reductant into the exhaust gases upstream of turbocharger 166, a selective catalytic reduction (SCR) catalyst 140 located downstream of turbo 166, and a noise suppression device 150 arranged downstream of SCR catalyst 140.

As illustrated in FIG. 1, a diesel particulate filter (DPF) 142 may be located downstream of SCR catalyst 140. In other embodiments, DPF 142 may be located upstream of SCR catalyst 140 or arranged downstream of turbocharger 166 and upstream of an additional diesel particulate filter. In yet other embodiments, a diesel particulate filter may be integral to SCR catalyst 140. Additionally, exhaust system 110 may include a plurality of exhaust pipes or passages for fluidically coupling the various exhaust system components. For example, as illustrated by FIG. 1, exhaust manifold 120 may be fluidically coupled to oxidation catalysts 134 and 136 by one or more of exhaust passages 162, 164, and 165. Similarly, SCR catalyst 140 may be fluidically coupled to noise suppression device 150 by exhaust passages 168 and 169 (via DPF 142). Finally, exhaust gases may be permitted to flow from noise suppression device 150 to the surrounding ambient environment via exhaust passage 170. Note that while not illustrated by FIG. 1, exhaust system 100 may include a particulate filter arranged upstream of SCR catalyst 140. Furthermore, it should be appreciated that exhaust system 100 may include two or more catalysts.

SCR catalyst 140 may reduce the amount of NOx that is ultimately discharged to the surrounding environment during operation of the engine. The SCR catalyst may utilize a liquid reductant such as an aqueous urea solution that is injected into the exhaust gases upstream of the SCR catalyst. Prior to reaching the SCR catalyst, the water droplets within the injected solution may evaporate. The remaining urea component then hydrolyzes and decomposes into ammonia which then enters the SCR catalyst via the exhaust gas flow stream. A catalytic coating within the SCR catalyst facilitates a reaction between the NOx component of the exhaust gas flow stream and the ammonia to break down the NOx into water vapor and nitrogen gas. The efficiency of this NOx reduction may be directly proportional to the degree of vaporization of the aqueous urea solution and uniformity of the distribution of the resulting ammonia within the engine exhaust gases upstream of the SCR catalyst.

As illustrated in FIG. 1, exhaust gases ejected by engine 110 (via manifold 120) may enter an exhaust treatment region 135 where the exhaust gases may first be combined by first flow combining passage 164. The exhaust gas flow may then be separated into two or more separated exhaust gas flows via exhaust separation passage 165. In other embodiments, the exhaust gas flow may be separated into three or four separate exhaust gas flows by exhaust separation passage 165, for example. Although illustrated as including two branches that have two passages that are substantially perpendicular to each other respectively, other embodiments may include an exhaust separation passage that has multiple branches that each consist of one passage (or multiple passages) that has multiple curves and/or bends and/or is variable in its cross-sectional area/shape.

The separated exhaust gas flows may then be received by oxidation catalysts 134 and 136. In other embodiments, the separated exhaust gas flows may be received by three or four oxidation catalysts, for example. By utilizing multiple oxidation catalysts and locating them upstream of turbocharger 166, oxidation catalysts 134 and 136 and SCR catalyst 140 may be arranged in closer proximity to engine 110. Thus, both the oxidation catalysts and the SCR catalyst, by virtue of being in closer proximity to engine 110, may be effectively located in warmer locations. Additionally, by first combining the exhaust gases ejected by individual cylinders, separating the resulting single exhaust gas flow and then re-combining the exhaust gas flow into a re-combined exhaust gas flow, the geometrical relationship between the plurality of separated exhaust gas flows upon being re-combined by the second downstream flow combining passage may be configured such that a more turbulent re-combined flow may be realized. This increased turbulence within the re-combined flow may increase the breakdown (into ammonia) and distribution of a liquid reductant (within the re-combined exhaust gas flow) injected therein.

During the period of time between initial start-up of a vehicle and the time at which an exhaust treatment system that includes an oxidation catalyst and an SCR catalyst reaches operating temperature (i.e., light-off temperature), emissions containing higher levels of NOx and carbon oxides may be passed to atmosphere. Therefore, by dividing the oxidation catalyst function among more than one oxidation catalyst and locating the multiple oxidation catalysts upstream of the turbocharger, the oxidation catalysts and SCR catalyst may be arranged in closer proximity to the engine (i.e., as opposed to a linear arrangement with a single oxidation catalyst located upstream or downstream of a turbocharger). As the effective thermal inertia of the multiple oxidation catalysts and the SCR catalyst is reduced by the additional heat energy received from the engine, the time at which the light-off temperature of the exhaust treatment system is achieved. This may result in lower light-off times for both the oxidation catalysts and the SCR catalysts, which in turn may result in a reduction of the amount of emissions that are subsequently released to the surrounding environment during the initial start-up phase of engine 110. Additionally, this increased thermal efficiency may reduce the need for parasitic rapid warming conventions (that reduce overall fuel economy) that may use fuel for heating purposes.

As illustrated in FIG. 1, the separated exhaust flows may be re-combined within a second, downstream flow combining passage 167. Although shown as combining two separated exhaust gas flows that are received from exhaust separation passage 165 (and oxidation catalysts 134 and 136), in other embodiments, downstream flow combining passage 167 may receive three or four separated exhaust gas flows and combine them into a single re-combined exhaust gas flow. The re-combined exhaust gas flow may then be received by turbocharger 166 and SCR catalyst 140. Prior to being received by turbocharger 166 and SCR catalyst 140, however, a liquid reductant, such as urea, may be injected into the re-combined exhaust gas flow. SCR catalyst 140 may utilize the liquid reductant (such as an aqueous urea solution) that is injected into the exhaust gases upstream of SCR catalyst 140. Prior to reaching the SCR catalyst, the water droplets within the injected solution may evaporate. The remaining urea component then hydrolyzes and decomposes into ammonia which then enters the SCR catalyst via the exhaust gas flow stream. A catalyst within the SCR catalyst facilitates a reaction between the NOx component of the exhaust gas flow stream and the ammonia to break down the NOx into water vapor and nitrogen gas. The efficiency of this NOx reduction may be directly proportional to the degree of vaporization of the aqueous urea solution and uniformity of the distribution of the resulting ammonia within the engine exhaust gases upstream of the SCR catalyst.

The degree of vaporization and the uniformity of the distribution of the resulting ammonia within the exhaust gases upstream of the SCR catalyst may be increased by funneling the exhaust gases (with liquid reductant suspended therein) through turbocharger 166 prior to passing them through SCR catalyst 140. The impingement of the exhaust gases upon the rotating blades integral and internal to turbocharger 166 may aid in the breakdown of the injected urea (suspended within the exhaust gases) into ammonia and in the uniformity of distribution of the ammonia droplets suspended within the exhaust gases. In some embodiments, the blades within turbocharger 166 may be coated with hydrolysis catalyst or SCR washcoat that may further enhance the breakdown of urea into ammonia. The exhaust gas flow may then be received from turbocharger 166 by SCR catalyst 140. Note that SCR catalyst 140 can include various SCR catalysts for reducing NOx or other products of combustion resulting from the combustion of fuel by engine 110. In some embodiments, a parameter of the reductant injection may be controlled by an electronic controller (not shown in FIG. 1). For example, reductant injection pressure, and/or injection volumetric flow rate, and/or the overall amount of reductant per injection may be varied via an electronic controller. As a non-limiting example, in some embodiments, the amount of reductant injected may be varied by the electronic controller in response to turbocharger operating speed. For example, since the residency time of the reductant in proximity to SCR catalytic material may vary with turbocharger speed, it may be advantageous to adjust the amount of reductant injected with turbocharger speed.

Note that with regards to vehicle applications, exhaust system 100 may be arranged on the underside of the vehicle chassis. Additionally, it should be appreciated that the exhaust passage portions coupling the various exhaust system components may include one or more bends or curves to accommodate a particular vehicle arrangement. Furthermore, the cross-sectional shapes of the various exhaust system components and the exhaust passage portions that couple the various exhaust system components may be circular, oval, rectangular, hexagonal, or any other suitable shape. Further still, it should be appreciated that in some embodiments, exhaust system 100 may include additional components not illustrated in FIG. 1 or may omit components described herein.

Figure 2:
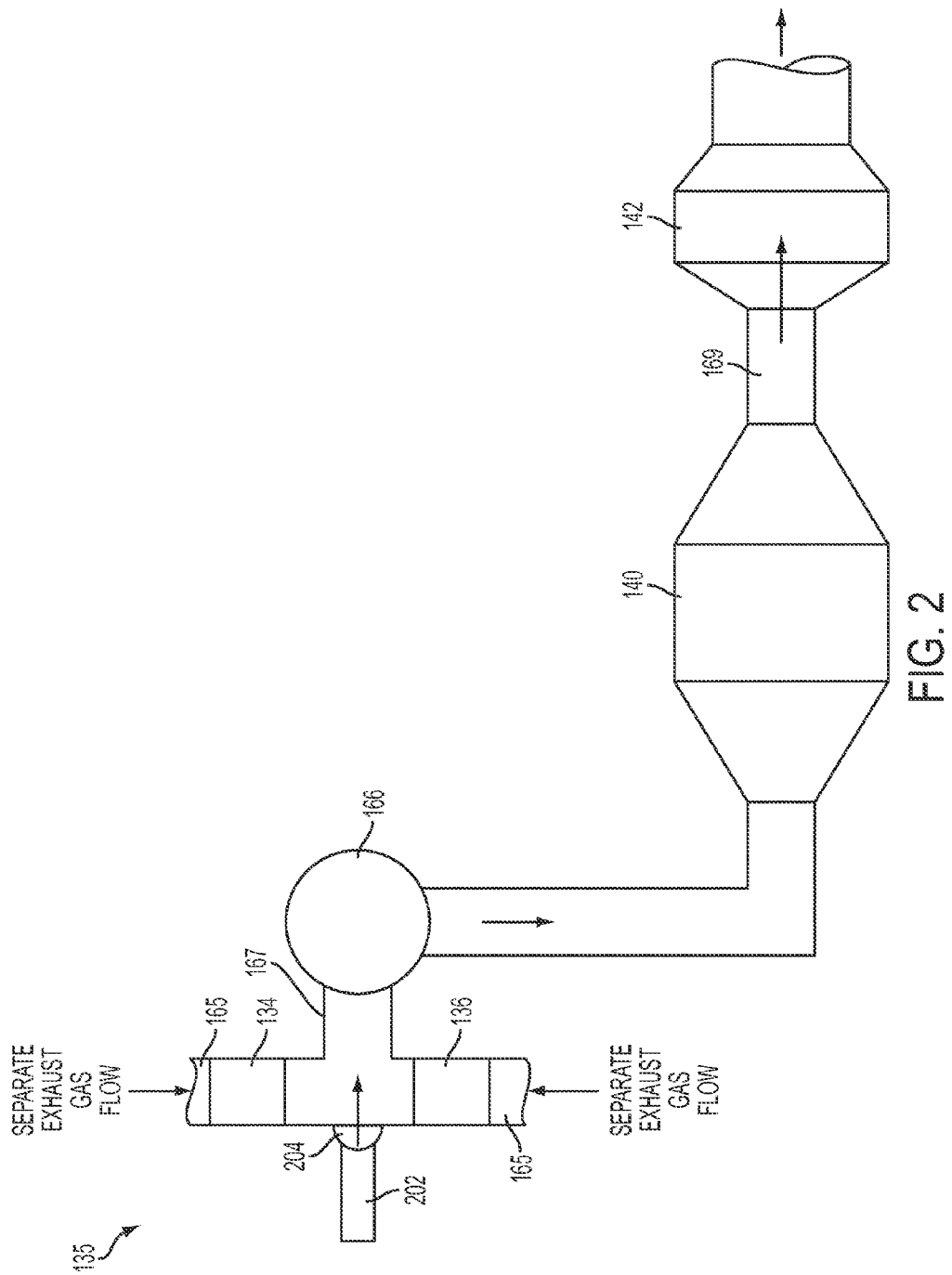
FIG. 2 illustrates a side view of the exhaust system of FIG. 1 in greater detail as a longitudinal cross-section according to an embodiment of the present disclosure.

FIG. 2 illustrates a side view of exhaust treatment region 135 in greater detail as a longitudinal cross-section. Injector 202 is shown coupled to a wall of downstream flow combining passage 167 by an injector boss 204. Injector 202 can inject, through an opening in the wall of the flow combining passage, a liquid supplied to it in response to a control signal received via a communication line (not shown in FIG. 1) from an electronic control system of engine 110.

As illustrated, injector 202 can inject the liquid at an angle of incidence that is substantially perpendicular to the direction of the separated exhaust flows ejected by oxidation catalysts 134 and 136. In other embodiments, injector 202 may inject liquid at an angle of incidence with respect to the direction of flow of one of the separated exhaust flows ejected by one of the oxidation catalysts that is greater than or less than ninety degrees. As non-limiting examples, injector 202 may inject liquid into one of the separated exhaust flows at an angle of incidence of 45°, 65°, 80°, or 120°. However, it should be appreciated that other angles may be utilized. In yet other embodiments, injector 202 may be located at a location on downstream flow combining passage 167 downstream of the point at which the separated exhaust flows are re-combined into a re-combined exhaust gas flow and upstream of the point at which the re-combined gas flow enters turbocharger 166. In yet other embodiments, injector 202 may be arranged such that liquid reductant may be injected directly into turbocharger 166. This may allow for reductant to impinge upon the blades of the turbocharger at a greater velocity that may increase the break-up and dispersion of the reductant within the combined exhaust gas flow.

Likewise, although shown in FIG. 2 as a substantially orthogonal angle, the angle between the direction of flow of a separate exhaust gas flow ejected by an individual oxidation catalyst and the direction of flow of the re-combined exhaust gas within flow combining passage 167 may be a non-orthogonal angle in other embodiments. For example, in other embodiments, the angle between the direction of flow of a separate exhaust gas flow ejected by an individual oxidation catalyst and the direction of flow of the re-combined exhaust gas flow may be 95°, 105°, 120°, or 150°. The spray pattern provided by injector 136 may include a variety of patterns for improving the evaporation rate and dispersion of the liquid reductant within the exhaust gas flow stream. For example, an injector can provide spray patterns that are configured as sheets, solids, or hollow cones. However, it should be appreciated that various other suitable spray patterns and/or shapes may be utilized. Additionally, the spray provided by an injector may be configured as substantially a liquid spray (i.e., no substantial amount of gas(es) entrained therein). In other embodiments the spray provided by an injector may be configured as an air-assisted spray (i.e., air entrained therein).

In some examples, geometric constraints associated with an exhaust system for a vehicle may increase the rate at which mixing and evaporation of the injected liquid reductant within the exhaust gas flow stream are to be performed so that the liquid spray is finely atomized prior to being absorbed by the catalyst. Further, some exhaust system configurations may require that the drops of liquid within the spray be less than a particular size to achieve a particular rate of evaporation and/or mixing of the liquid into the exhaust gases. As one non-limiting example, the drops of liquid within the spray may be less than 40 microns in diameter, for some exhaust systems. However, the price of an injector may increase in proportion to a decrease in the size of the drops of liquid provided by the spray. Thus, in order to reduce cost of the injector, it may be desirable to improve mixing and evaporation rates so that an injector that produces a spray that is comprised of larger drops of liquid may be used.

As described above with regard to FIG. 2, the impingement of the exhaust gases upon the rotating blades integral and internal to turbocharger 166 may aid in the breakdown of the injected urea (suspended within the exhaust gases) into ammonia and in the uniformity of distribution of the ammonia droplets suspended within the exhaust gases. As mentioned above, in some embodiments, the blades of turbocharger 166 may be coated with a hydrolysis catalyst coating to enhance the breakdown of injected urea into ammonia. In some embodiments, the blades of turbocharger 166 may be coated with selective catalytic reduction (SCR) washcoat that may enhance the breakdown of injected into ammonia and enhance NOx conversion. The SCR washcoat layer may be applied to each turbocharger blade after the blades are subjected to a heat and/or chemical surface treatment. As such, the size and hence the overall cost of the downstream SCR catalyst 140 may be reduced. In some embodiments, the addition of an SCR washcoat layer on the blades of turbocharger 166 may allow for a filter substrate integral to DPF 142 to be coated with SCR washcoat and as such, allow for removal of NOx and particulate matter sans an SCR catalyst or with a smaller SCR catalyst. The overall cost of the exhaust treatment system may thereby be reduced.

As mentioned above, by virtue of arranging oxidation catalysts 134 and 136 upstream of turbocharger 166, both the oxidation catalysts and SCR catalyst 140 may be arranged in closer proximity to engine 110. As such, the light-off times of both oxidation catalysts and the SCR catalyst may be decreased due to increased amount of heat energy received by the catalysts from the engine. Additionally, these reduced light-off times, in concert with improved SCR NOx conversion efficiency may allow for higher feedgas NOx emissions. In other words, the exhaust gas circulation (EGR) rate may be reduced at light engine loads, fuel economy and engine transient response may be improved, and the workload of turbocharger 166 may be reduced.

Figure 3:
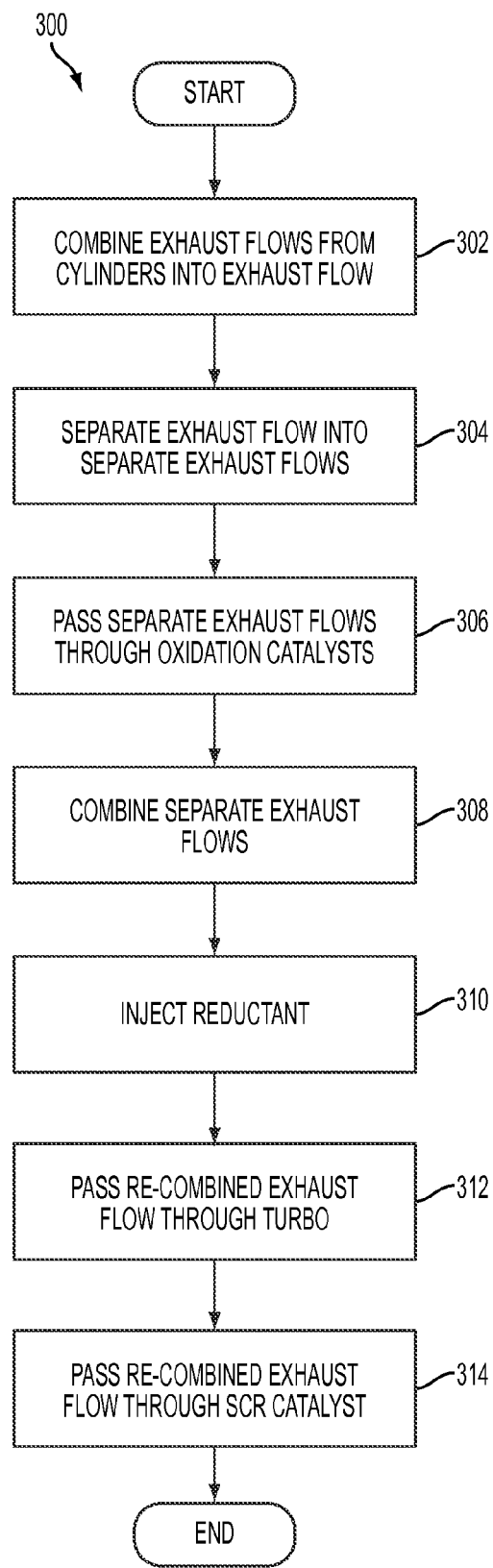
FIG. 3 illustrates a process flow for transporting and treating exhaust gases via the exhaust system of FIG. 1 according to an embodiment of the present disclosure.

FIG. 3 illustrates a process flow for the transporting and treating of exhaust gases by exhaust system 100. At 302, exhaust gases ejected by individual cylinders of engine 110 may be combined into a single exhaust gas flow. At 304, the single exhaust gas flow may be separated into separate exhaust gas flows. At 306, the separate exhaust gas flows may each be passed through a separate oxidation catalyst. At 308, the separate exhaust gas flows may be received from the oxidation catalysts by a flow combining passage where they may be re-combined into a single re-combined exhaust gas flow. At 310, a liquid reductant may be injected into the re-combined exhaust gas flow. It should be appreciated that in some embodiments, however, liquid reductant may be injected upstream of the flow combining passage (i.e., prior to the separate exhaust gas flows being re-combined). In other words, liquid reductant may be injected into an individual separate exhaust gas flow or may be injected into multiple separate exhaust gas flows prior to the separate exhaust gas flows reaching the flow combining passage.

At 312, the re-combined exhaust gas flow may be passed through a turbocharger. As discussed above, the impingement of the re-combined exhaust gas flow (with injected liquid reductant injected therein) upon the blades of the turbocharger at 312 may aid in the breakdown of the liquid reductant into ammonia. Correspondingly, the efficiency of NOx conversion at 314, where the re-combined exhaust gas flow is passed through a SCR catalyst, may be increased.

It should be appreciated that the configurations disclosed herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine exhaust gas treatment system, comprising:
an injector directing a spray of reductant into exhaust gas;
an exhaust manifold leading to a first flow passage that receives an exhaust gas flow, the exhaust manifold combining exhaust gases from a plurality of cylinders;
an exhaust separation passage, downstream of the first flow passage, that separates the exhaust gas flow into a plurality of separate exhaust gas flows;
a plurality of oxidation catalysts, each of which receives one of the plurality of separate exhaust gas flows;
a second, downstream, flow combining passage that receives the plurality of separate exhaust gas flows and combines them into a re-combined exhaust gas flow;
a turbocharger that receives the re-combined exhaust gas flow; and
a selective catalytic reduction catalyst positioned downstream of the turbocharger.

2. The system of claim 1, wherein blades of the turbocharger are coated with a hydrolysis catalyst.

3. The system of claim 1, wherein blades of the turbocharger are coated with a selective catalytic reduction washcoat.

4. The system of claim 1, wherein the injector is configured to direct the spray of reductant into the turbocharger.

5. The system of claim 1, wherein the injector is configured to direct the spray of reductant into the re-combined exhaust gas flow upstream of the turbocharger.

6. The system of claim 1, wherein the injector is configured to direct the spray of reductant into at least one of the plurality of separate exhaust gas flows, downstream of one of the plurality of oxidation catalysts.

7. The system of claim 1, wherein the exhaust gas flow that is separated by the exhaust separation passage is received by the exhaust separation passage from an engine.

8. The system of claim 1, wherein re-combined exhaust gas flow is received by the turbocharger from the first flow passage.

9. The system of claim 1, further including a controller that adjusts an amount of reductant injected in response to turbocharger operating speed.

10. A method of treating engine exhaust gases, comprising:
spraying reductant into the exhaust gases;
combining, separating, and then re-combining exhaust gases, the exhaust gases flowing through separate oxidation catalysts when separated;
reacting the re-combined exhaust gases with a hydrolysis catalyst coated on turbocharger blades during expansion through a turbocharger; and
passing the expanded re-combined exhaust gas flow through a selective catalytic reduction catalyst.

11. The method of claim 10, further comprising directing the spray of reductant into the turbocharger.

12. The method of claim 10, further comprising directing the spray of reductant into the re-combined exhaust gas flow upstream of the turbocharger.

13. The method of claim 10, further comprising directing the spray of reductant into at least one of the plurality of separated exhaust gas flows, downstream of the separate oxidation catalysts from which the one of the separated exhaust gas flows was ejected.

14. The method of claim 10, wherein the reductant is injected at an angle of incidence that is substantially perpendicular to a direction of the separated exhaust flows ejected by each oxidation catalyst.

15. The method of claim 10, wherein the reductant is injected at an angle of incidence with respect to a direction of flow of one of the separated exhaust flows ejected by one of the oxidation catalysts that is less than perpendicular.

16. A method of treating engine exhaust gases, comprising:
spraying reductant into the exhaust gases;
combining, separating, and then re-combining exhaust gases, the exhaust gases flowing through separate oxidation catalysts when separated;

reacting the re-combined exhaust gases with a selective catalytic reduction washcoat coated on turbocharger blades during expansion through a turbocharger; and passing the expanded re-combined exhaust gas flow through a selective catalytic reduction catalyst.

17. The method of claim 16, further comprising directing the spray of reductant into the turbocharger.

18. The method of claim 16, further comprising directing the spray of reductant into the re-combined exhaust gas flow upstream of the turbocharger.

19. The method of claim 16, further comprising directing the spray of reductant into at least one of the plurality of separated exhaust gas flows, downstream of the separate oxidation catalysts from which the one of the separated exhaust gas flows was ejected.

20. The method of claim 16 wherein the reductant is injected at an angle of incidence that is substantially perpendicular to a direction of the separated exhaust flows ejected by each oxidation catalyst.

* * * * *